(12) United States Patent
Okamoto et al.

(10) Patent No.: US 12,366,521 B2
(45) Date of Patent: Jul. 22, 2025

(54) CIRCULARLY POLARIZED LIGHT ILLUMINATOR, ANALYSIS DEVICE, AND MICROSCOPE

(71) Applicant: INTER-UNIVERSITY RESEARCH INSTITUTE COPORATION NATIONAL INSTITUTES OF NATURAL SCIENCES, Tokyo (JP)

(72) Inventors: Hiromi Okamoto, Aichi (JP); Tetsuya Narushima, Aichi (JP)

(73) Assignee: INTER-UNIVERSITY RESEARCH INSTITUTE COPORATION NATIONAL INSTITUTES OF NATURAL SCIENCES, Tokyo (JP)

( * ) Notice: Subject to any disclaimer, the term of this patent is extended or adjusted under 35 U.S.C. 154(b) by 164 days.

(21) Appl. No.: 18/547,335

(22) PCT Filed: Feb. 9, 2022

(86) PCT No.: PCT/JP2022/005014
§ 371 (c)(1),
(2) Date: Aug. 22, 2023

(87) PCT Pub. No.: WO2022/181320
PCT Pub. Date: Sep. 1, 2022

(65) Prior Publication Data
US 2024/0142370 A1    May 2, 2024

(30) Foreign Application Priority Data
Feb. 25, 2021  (JP) ................ 2021-029181

(51) Int. Cl.
*G01N 21/21*  (2006.01)
*G01N 21/19*  (2006.01)
*G02B 21/00*  (2006.01)

(52) U.S. Cl.
CPC ............ *G01N 21/21* (2013.01); *G01N 21/19* (2013.01); *G02B 21/0032* (2013.01); *G02B 21/0092* (2013.01); *G01N 2021/216* (2013.01)

(58) Field of Classification Search
CPC ................ G02B 21/0092; G02B 21/14; G02B 21/0032; G02B 21/06; G01J 4/00;
(Continued)

(56) References Cited

U.S. PATENT DOCUMENTS 3,471,240 A * 10/1969 Grosjean ................ G01N 21/19
346/33 A
4,672,196 A * 6/1987 Canino ................ G01B 11/065
356/369

(Continued)

FOREIGN PATENT DOCUMENTS

JP     2002122477 A    4/2002
JP     2013015500 A    1/2013
(Continued)

*Primary Examiner* — Gordon J Stock, Jr.
(74) *Attorney, Agent, or Firm* — HAUPTMAN HAM, LLP

(57) ABSTRACT

An analysis device and a microscope use a circularly polarized light illuminator including a light source emitting pulsed light, a polarized light divider dividing the pulsed light from the light source or linearly polarized light extracted from the pulsed light into an x-axis direction polarized light component and a y-axis direction polarized light component, an optical delay unit delaying one of a pulse of the divided x-axis and y-axis direction polarized light components in relation to the other, a polarized light combining unit combining the X-polarized light pulsed beam and the Y-polarized light pulsed beam emitted from the optical delay unit coaxially to generate a linearly polarized beam having a modulation in which the X-polarized light pulse and the Y-polarized light pulse repeat alternately, and a polarized light conversion unit converting the linearly (Continued)

polarized light emitted from the polarized light synthesis unit into circularly polarized light.

16 Claims, 13 Drawing Sheets

(58) Field of Classification Search
CPC ... G01J 4/02; G01J 4/04; G01N 21/19; G01N 21/21; G01N 21/23; G01N 2021/216; G01N 2021/4792
See application file for complete search history.

(56) References Cited

U.S. PATENT DOCUMENTS

| | | | |
|---|---|---|---|
| 6,609,841 B1* | 8/2003 | Wilde | G11B 11/10541 |
| 7,692,796 B2* | 4/2010 | Hirata | G01B 9/02003 |
| | | | 356/489 |
| 9,158,100 B2* | 10/2015 | Yokoi | G02B 21/16 |
| 10,746,528 B2* | 8/2020 | Osawa | G01N 21/23 |
| 11,199,495 B2* | 12/2021 | Ding | G01N 21/3581 |
| 11,630,292 B2* | 4/2023 | Schumann | G02B 27/283 |
| | | | 359/372 |
| 2005/0134687 A1 | 6/2005 | Kaminsky et al. | |
| 2008/0002184 A1* | 1/2008 | Toda | G01N 21/21 |
| | | | 356/73 |

FOREIGN PATENT DOCUMENTS

| | | | | |
|---|---|---|---|---|
| JP | 2017120255 A | 7/2017 | | |
| JP | 6633685 B2 * | 1/2020 | | A61B 5/0066 |

* cited by examiner

Glass substrate

CIRCULARLY POLARIZED LIGHT ILLUMINATOR, ANALYSIS DEVICE, AND MICROSCOPE

CROSS-REFERENCE TO RELATED APPLICATIONS

The present application is a National Phase of International Application No. PCT/JP2022/005014 filed Feb. 9, 2022, which claims the benefit of priority from the prior Japanese patent application No. 2021-029181 filed on Feb. 25, 2021.

TECHNICAL FIELD

The present invention relates to a light illuminator that emits circularly polarized light, and an analysis device and a microscope equipped with this light illuminator. More specifically, the present invention relates to a technique of irradiating a sample with circularly polarized light and measuring optical properties such as circular dichroism.

BACKGROUND ART

Circular dichroism (CD) is a phenomenon in which left circularly polarized light and right circularly polarized light have different absorptions, and is represented by a difference in absorption between left and right circularly polarized light. This circular dichroism is a property peculiar to optically active materials, and is used for the analysis of optically active materials, the measurement of the abundance of optical isomers, the analysis of the structure and state of biomolecules, and the like.

Generally, in a circular dichroism spectrometer, left circularly polarized light and right circularly polarized light are periodically generated by a photoelastic modulator or the like, to irradiate a sample, and the intensity of light transmitted through the sample is detected in synchronization with the modulation frequency. FIG. 15 is a schematic diagram showing a configuration example of a conventional circularly polarized light illuminator. As shown in FIG. 15, the circularly polarized light illuminator used for conventional circular dichroism measurement makes light emitted from a light source 100 enter a linear polarizer 101 to extract linearly polarized light, which is then modulated into left circularly polarized light or right circularly polarized light by a photoelastic modulator 102.

Light generated by a photoelastic modulator is typically in a left or right polarized state at particular phases, such as 0° and 180°, and is in a linearly polarized or elliptically polarized state including linearly polarized light in all the other phases. For this reason, the conventional apparatus as shown in FIG. 15 cannot irradiate a sample with purely left-right circularly polarized light that is not commingled with linearly polarized light, and is considered difficult to measure the circular dichroism of solid samples and samples with macroscopic anisotropy with high accuracy.

In addition, in a case where the sample has polarization properties other than circular dichroism such as dichroism or birefringence for linearly polarized light in the circular dichroism measurement described above, if the circular polarization modulation has nonlinearity or phase distortion, the polarization properties other than circular dichroism are commingled into a circular dichroism signal, resulting in artifacts. In particular, when the sample is consist of such as liquid crystal or solid crystal material, or has macroscopic anisotropy such as in a film, micelle or gel, the artifacts originated by linearly polarized light is large, and hence, for example, several methods to remove artifacts for linearly polarized light, such as measuring a rotated sample at different orientations or measuring both sides of the sample by flipping it over and averaging measured values for the both sides have been examined (see Patent Document 1).

On the other hand, conventionally, attempts of microscopic measurement have been made to obtain the spatial distribution of the circular dichroism intensity of samples such as solids or films, but, in such microscopic measurements, it is difficult to flip over or rotate the sample. Therefore, in order to ensure the reliability of the measured results, a method of changing the relative angle of the polarizer to the quarter wavelength plate to produce left circularly polarized light or right circularly polarized light, and constructing a circular dichroism image from the difference of transmission images for each circularly polarized light obtained when illuminating them, without using circular polarization modulation, has been proposed (see Patent Document 2).

In addition, circular dichroism has signal strength much smaller than those of other polarization properties such as dichroism and birefringence for linearly polarized light, and therefore, there is a demand for a technique to detect the intensity of light transmitted through a sample with high sensitivity by synchronizing it with the modulation frequency. In this regard, the present inventors have proposed the "discrete circularly polarized light modulation method" in which a sample is repeatedly and discretely irradiated with only left circularly polarized light or right circularly polarized light, which greatly suppresses the effects of artifacts caused by linearly polarized light to realize tiny signal detection (see Patent Document 3). Since the discrete circularly polarized light modulation method described in Patent Document 3 does not include any linearly polarized light component, the reliability of circular dichroism measurement is always ensured, and microscopic measurement using this method (a circular dichroism microscope) can realize a high spatial resolution of sub-µm such as 300 to 400 nm.

CITATION LIST

Patent Literatures

Patent Literature 1: JP-A-2002-122477
Patent Literature 2: US Patent Application Publication No. 2005/0134687
Patent Literature 3: JP-A-2017-120255 (U.S. Pat. No. 6,784,396)

SUMMARY OF INVENTION

Technical Problem

However, the artifact removal technique described above has the following problems. For example, the measurement method described in Patent Literature 1 cannot be applied to samples or devices that are difficult to rotate or flip as described above. In addition, the technique described in Patent Document 2 constructs a circular dichroism image from the difference of transmission images for left circularly polarized light and right circularly polarized light, and hence, it is difficult to use highly sensitive techniques such as lock-in detection that are necessary to detect circular dichroism signals with extremely low signal intensities. In addition, the microscope described in Patent Document 2 acquires images at different timings, so there is also the problem that misalignment of the observed area is likely to occur.

On the other hand, the discrete circularly polarized light modulation method described in Patent Document 3 has a configuration in which left circularly polarized light and right circularly polarized light are alternately emitted by blocking light with a mechanical optical chopper, so the theoretical upper limit of the modulation frequency is limited to around 1 kHz. Therefore, in the method described in Patent Document 3, it takes about 20 minutes to 1 hour to scan the sample and acquire one circular dichroism image, and thus, in order to apply it to the field of real-time observation, such as for the dynamics of biological samples, it is necessary to increase the measurement speed. In addition, the method described in Patent Document 3 is also required to be further improved in terms of detection sensitivity.

Accordingly, an object of the present invention is to provide a circularly polarized light illuminator capable of measuring circular dichroism at high speed and with high sensitivity, and an analysis device and a microscope using the same.

Solution to Problem

The circularly polarized light illuminator according to the present invention comprises a light source that emits pulsed light, a polarized light dividing unit that divides the pulsed light emitted from the light source into an x-axis direction polarized light component and a y-axis direction polarized light component, an optical delay unit that delays one of a pulse of the x-axis direction polarized light component and a pulse of the y-axis direction polarized light component divided in the polarized light dividing unit in relation to the other, a polarized light combining unit that combines a pulsed beam composed of the x-axis direction polarized light component with a pulsed beam composed of the y-axis direction polarized light component emitted from the optical delay unit as a coaxial beam to generate a pulsed beam of linearly polarized light having a modulation in which the x-axis direction polarized light component pulse and the y-axis direction polarized light component pulse repeat alternately, and a conversion unit of polarized light that converts the linearly polarized light emitted from the polarized light combining unit into circularly polarized light.

In the circularly polarized light illuminator of the present invention, a pulsed beam of circularly polarized light having a modulation in which a right circularly polarized light pulse and a left circularly polarized light pulse alternately repeat can be emitted from the conversion unit of polarized light.

The optical delay unit may be configured such that, for example, the optical path length of either one of the x-axis direction component and the y-axis direction component of the incident linearly polarized light is longer than the optical path length of the other. In that case, the optical delay unit is provided with an extended optical path composed of, for example, a rectangular prism mirror and a retroreflector.

Further, the optical delay unit can set a delay time such that a pulse of the delayed component is emitted between one pulse of the non-delayed component and the next pulse.

On the other hand, the polarized light dividing unit may be composed of an optical element that displaces, or changes the angle of, the optical axis of either one of the x-axis direction polarization component and the y-axis direction polarization component with respect to the optical axis at the incidence, for example.

The analysis device according to the present invention includes the circularly polarized light illuminator described above, irradiates a sample with circularly polarized light emitted from the circularly polarized light illuminator, and measures the optical properties of the sample.

The analysis device of the present invention can comprise one or more photodetectors that detect transmitted light, reflected light, scattered light, or luminescence from the sample as electrical signals.

Further, a circular dichroism detection unit may be provided for obtaining a circular dichroism signal from the electrical signal detected by the photodetector.

In that case, in the circular dichroism detection unit, the electric signal of the transmitted light detected by the photodetector can be lock-in-detected at a repetition frequency f of the pulsed beam emitted from the light source, and the relative intensity difference between the left circularly polarized light and the right circularly polarized light in the transmitted light can be evaluated, to obtain a circular dichroism signal.

Alternatively, in the circular dichroism detection unit, the response to the right circularly polarized light pulse and the left circularly polarized light pulse of the transmitted light detected by the photodetector may be separately integrated, and the signal intensity when irradiated with the right circularly polarized pulse and the signal intensity when irradiated with the left circularly polarized pulse may be evaluated independently, and the circular dichroism signal may be calculated from the intensity difference between them.

A microscope according to the present invention includes the above-described circularly polarized light illuminator, and irradiates a sample to be observed with circularly polarized light emitted from the circularly polarized light illuminator.

The microscope of the present invention may have a configuration including an objective lens for collecting transmitted light from the sample, an imaging lens that forms an image of the transmitted light emitted from the objective lens, a photodetector that detects the transmitted light as an electrical signal; and a circular dichroism detection unit that obtains a circular dichroism signal from the electrical signal detected by the photodetector.

In that case, in the circular dichroism detection unit, the electric signal of the transmitted light detected by the photodetector may be lock-in-detected at a repetition frequency f of the pulsed beam emitted from the light source, and the relative intensity difference between the left circularly polarized light and the right circularly polarized light in the transmitted light may be evaluated, to obtain a circular dichroism signal.

Alternatively, in the circular dichroism detection unit, the response to the right circularly polarized light pulse and the left circularly polarized light pulse of the transmitted light detected by the photodetector can be separately integrated, and the signal intensity when irradiated with the right circularly polarized pulse and the signal intensity when irradiated with the left circularly polarized pulse can be evaluated independently, and the circular dichroism signal can be calculated from the intensity difference between them.

Further, in the microscope of the present invention, a core section of an optical fiber may be placed at an image forming position of the transmitted light, and a part of the image of the transmitted light may be extracted by the optical fiber and transmitted to the photodetector.

Advantageous Effects of Invention

According to this invention, it is possible to improve the modulation frequency compared to the conventional one, and to realize high-speed and high-sensitivity circular dichroism measurement.

BRIEF DESCRIPTION OF DRAWINGS

FIG. 7A shows the detection signal when the sample 3 does not have circular dichroism, and FIGS. 7B and 7C show the detection signals when the sample 3 has circular dichroism.

FIG. 8A shows the signal when the sample 3 does not have circular dichroism, and FIGS. 8B and 8C show the signals when the sample 3 have circular dichroism.

FIG. 14A is a diagram showing changes in intensity of modulated circularly polarized light, and FIG. 14B is a diagram showing intensity fluctuations of a pulsed laser light source.

DESCRIPTION OF EMBODIMENTS

Hereinafter, the form for implementing this invention is demonstrated in detail with reference to the attached drawings. Not that the present invention is not limited to embodiments described below.

First Embodiment

Figure 1:
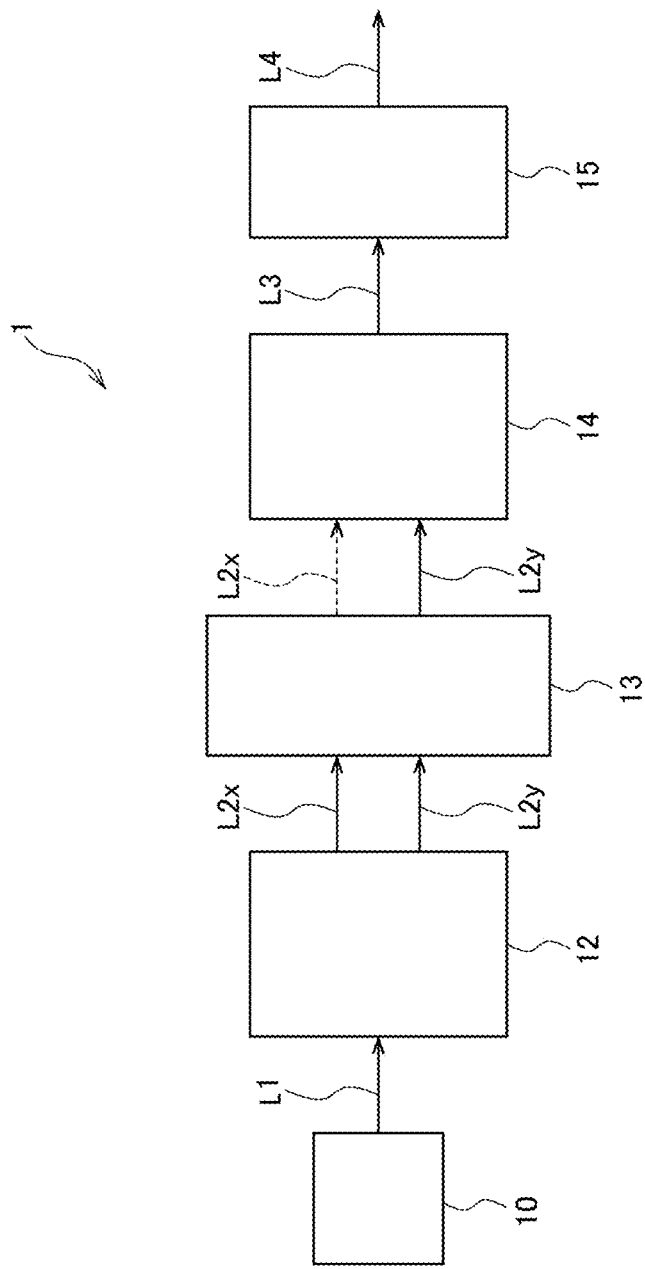
FIG. 1 is a conceptual diagram showing the configuration of a circularly polarized light illuminator according to a first embodiment of the present invention.
Figure 2:
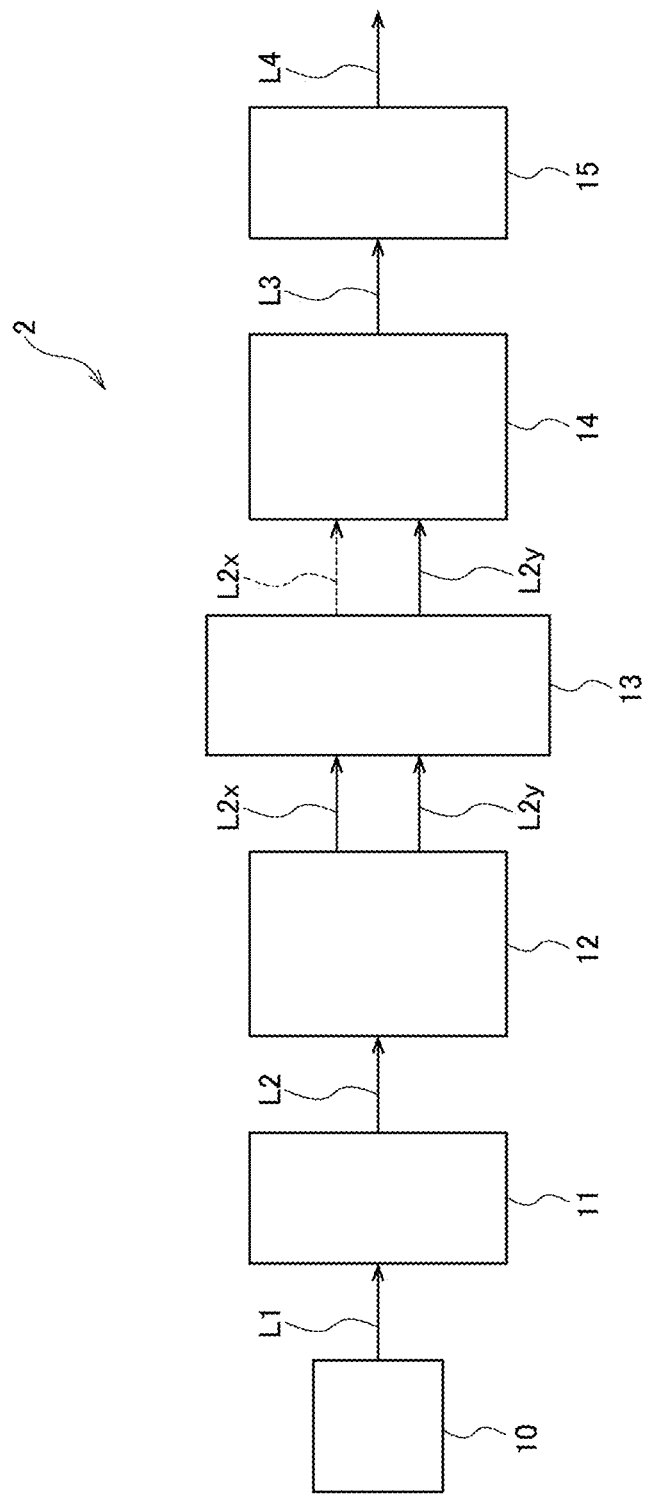
FIG. 2 is a conceptual diagram showing the configuration of a circularly polarized light illuminator of a modified example of the first embodiment of the present invention.
Figure 3:
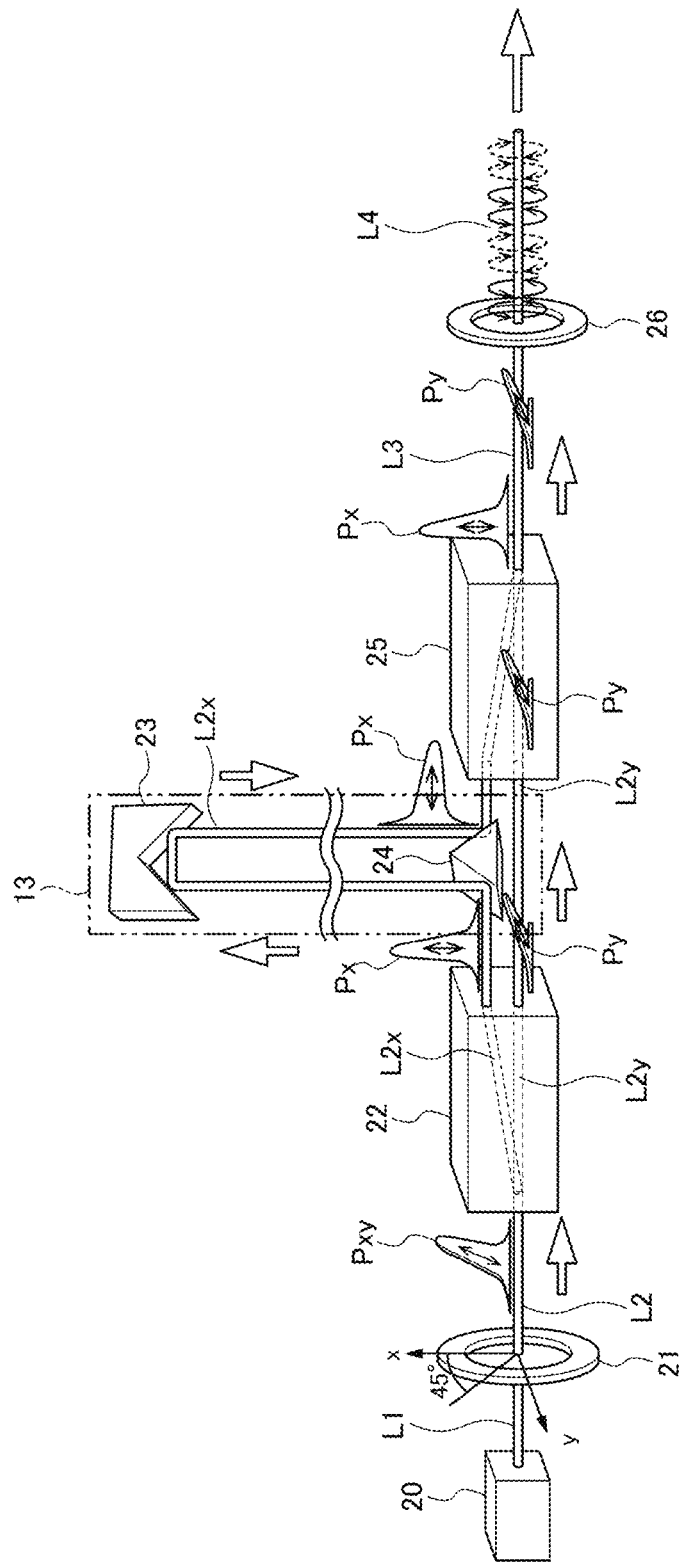
FIG. 3 is a schematic diagram showing a specific configuration example of the circularly polarized light illuminator shown in FIG. 2.

First, a circularly polarized light illuminator according to a first embodiment of the present invention will be described. FIG. 1 is a conceptual diagram showing the configuration of a circularly polarized light illuminator according to this embodiment, and FIG. 2 is a conceptual diagram showing the configuration of a circularly polarized light illuminator according to a modification thereof. Further, FIG. 3 is a schematic diagram showing a specific configuration example of the circularly polarized light illuminator 2 shown in FIG. 2.

As shown in FIG. 1, the circularly polarized light illuminator 1 of the present embodiment irradiates circularly polarized light, and includes at least a light source 10, a polarized light dividing unit 12, an optical delay unit 13, a polarized light combining unit 14, and a conversion unit of polarized light 15. Further, according to the present invention, a polarized light adjustment unit 11 and other optical elements may be provided between the light source 10 and the polarized light dividing unit 12, like the circularly polarized light illuminator 2 of the modified example shown in FIG. 2.

[Light Source 10]

The light source 10 should only be capable of pulsed light emission, and for example, various lasers such as solid-state lasers and semiconductor lasers (LD: Laser Diode), and light emitting elements such as light emitting diodes (LED: Light Emitting Diode) can be used. The light source 10 can be appropriately selected according to the type of samples, the wavelength of detection light, and the like, and from the viewpoints of light utilization efficiency, brightness, and focusing, it is preferable to use a device that emits collimated light (parallel light), such as a laser.

On the other hand, from the viewpoint of improving the sensitivity, speed and stability of circular dichroism measurement and miniaturizing the device, it is preferable to use a high-repetition pulse laser having a pulse width of sub-nanoseconds or less and a repetition frequency of about 50 to 100 MHz for the light source 10. The pulsed beam L1 emitted from the light source 10 is not limited to linearly polarized light, and it is sufficient if it is light containing x-axis direction polarized light component and y-axis direction polarized light component, and may be non-polarized light, circularly polarized light, or elliptically polarized light.

[Polarized Light Adjustment Unit 11]

The polarized light adjustment unit 11 extracts linearly polarized light from the pulsed beam L1 emitted from the light source 10, adjusts the ratio of the polarization components contained in the pulsed beam L1, and improves the extinction ratio, and if necessary, it is placed between the light source 10 and the polarized light dividing unit 12 and on the optical axis of the pulsed beam L1. In the pulsed beam L1 emitted from the light source 10, the light intensities of the x-axis direction polarized component and the y-axis direction polarized component may not be the same, and in this case, a difference occurs between the intensities of left circularly polarized light and right circularly polarized light generated by the polarized light conversion unit 15. If the left circularly polarized light and the right circularly polarized light emitted from the circularly polarized light illuminator are out of balance, when used for circular dichroism measurement, etc., an offset may occur in the obtained circular dichroism signal.

Therefore, in the circularly polarized light illuminator of this embodiment, an optical element such as a half wavelength plate is arranged in the polarized light adjustment unit 11 to rotate the polarization direction of the pulsed beam L1, adjust the ratio of the polarization components, and improve the extinction ratio, to equalize the light intensities of the x-axis direction polarization component and the y-axis direction polarization component. As a result, a circularly polarized light pulsed beam in which the light intensities of the right circularly polarized light pulse and the left circularly polarized light pulse are the same can be emitted from the circularly polarized light illuminator.

Further, when the pulsed beam L1 emitted from the light source 10 contains components other than linearly polarized light, it is also possible to place an optical element such as a linear polarizer in the polarized light adjustment unit 11 to extract only the linearly polarized light component from the pulsed beam L1. Examples of linear polarizers placed in the polarized light adjustment unit 11 include various prisms such as Glan-Thompson, Glan-Taylor, and Glan-Laser using birefringent crystals, absorption type polarizing filters using plastic films or the like, thin film polarizing elements, wire grid type polarizers, and the like. A case in which the linearly polarized light L2 is extracted from the polarized light adjustment unit 11 will be described below as an example, and the same applies when light other than linearly polarized light (non-polarized light, circularly polarized light, elliptically polarized light, etc.) is emitted from the polarized light adjustment unit 11.

[Polarized Light Dividing Unit 12]

The polarized light dividing unit 12 divides the pulsed beam L1 emitted from the light source 10 or the linearly polarized light L2 extracted by the polarized light adjustment unit 11 into an x-axis direction polarization component and a y-axis direction polarization component and, it is placed on the optical axis of the linearly polarized light L2. In this polarized light dividing unit 12, for example, by displacing the optical axis of either one or both of the x-axis direction polarization component and the y-axis direction polarization component with respect to the optical axis of the pulsed beam L1 or the linearly polarized light L2, or by changing the angle (travelling direction) of the optical axis, the pulsed beam L1 or linearly polarized light L2 is divided into a pulse (X-polarized light pulse) beam L2$x$ composed of an x-axis direction polarized component and a pulse (Y polarized pulse) beam L2$y$ composed of an y-axis direction polarized component.

Examples of the optical element constituting the polarized light dividing unit 12 include a polarizing beam displacer (PBD) using calcite, a Wollaston prism, a Glan-Taylor prism, a Glan-Laser prism, a Rochon prism, a Savart plate, and a polarizing beam splitter (PBS), and the like. Among these optical elements, the polarization beam displacer and the Savart plate are optical axis displacement elements 22, and the other elements are optical axis angle changing elements.

The optical element that constitutes the polarized light dividing unit 12 may be any element that can separate the pulsed beam L1 or the linearly polarized light L2 into an x-axis direction polarization component and a y-axis direction polarization component, and the type and the number thereof are not particularly limited. For example, even with a configuration in which a non-polarizing beam splitter and a plurality of linear polarizers are married, it is possible to separate the x-axis direction polarization component and the y-axis direction polarization component.

Further, when the polarization extinction ratio of the optical element that divides the linearly polarized light L2 is low, a linear polarizer having a high extinction ratio is placed on each optical axis of the separated X-polarized pulsed beam L2$x$ and Y-polarized pulsed beam L2$y$, and this makes it possible to obtain an effect equivalent to that obtained by using a division element with a high polarization extinction ratio. However, from the viewpoint of reducing the number of components, it is preferable to use an optical element that divides components in linearly polarized light with a high polarization extinction ratio as the optical element that constitutes the polarized light dividing unit 12.

[Optical Delay Unit 13]

The optical delay unit 13 is placed on the optical axis of the X-polarized light pulsed beam L2$x$ and/or the Y-polarized light pulsed beam L2$y$ divided by the polarized light dividing unit 12, and delays the pulse of the component (x-axis direction polarized light component or y-axis direction polarized light component) with the optical axis displaced or the optical axis angle changed, than the pulse of the other component (y-axis direction polarized light component or x-axis direction directional polarized light component). Although the configuration of the optical delay unit 13 is not particularly limited, for example, a configuration in which an extended optical path composed of optical elements such as a rectangular prism mirror and a retroreflector is provided, and the optical path length of either one of the x-axis direction polarized component or the y-axis direction polarized component is longer than the optical path length of the other, alternatively, a configuration that decrease the speed of light of the x-axis direction polarized component or the y-axis direction polarized component by passing through a substance with a high refractive index, and the like, can be applied.

Here, it is preferable that the optical axis is displaced or the angle of the optical axis is changed, and the delay time of the delayed component is set so that the pulse from the delayed component is emitted between one pulse and the next pulse of the non-delayed component (which does not displace the optical axis or change the angle of the optical axis), and it is more preferable to be set to ½ of the repetition period of the pulsed beam L1 emitted from the light source 10. As a result, it is possible to emit the pulse from the delayed component (by displacing the optical axis or changing the angle of the optical axis) from the optical delay unit 13 at the middle timing between one pulse and the next pulse of the non-delayed component (which does not displace the optical axis or change the angle of the optical axis), and therefore, the X-polarized pulse Px and the Y-polarized pulse Py can be caused to enter the polarized light combining unit 14 alternately and at equal intervals.

[Polarized Light Combining Unit 14]

The polarized light combining unit 14 coaxially combines the X-polarized light pulsed beam L2x with the Y-polarized light pulsed beam L2y emitted from the optical delay unit 13, thereby obtaining a linearly polarized light pulsed beam L3 having a modulation in which a linearly polarized pulses in the x-axis direction (X-polarized light pulses Px) and a linearly polarized pulses in the y-axis direction (Y-polarized light pulses Py) repeat alternately. The polarized light combining unit 14 is placed on the optical axis of the X-polarized light pulsed beam L2x and the Y-polarized light pulsed beam L2y emitted from the optical delay unit 13. Further, in the polarized light combining unit 14, for example, the component of the two incident pulsed beams delayed by the optical delay unit 13 is shifted so that the optical axis is coaxial with the non-delayed component, or the optical axis angle (travelling direction) is changed.

Similar to the polarized light dividing unit 12 described above, the optical elements constituting the polarized light combining unit 14 include, for example, a polarization beam displacer (PBD) using calcite, a Wollaston prism, a Glan-Taylor prism, a Glan-Laser prism, a Rochon prism, a Savart plate, a polarizing beam splitter (PBS), and the like. Further, for example, even in a configuration in which a non-polarization beam splitter and a plurality of linear polarizers are married, it is possible to combine the X-polarized light pulsed beam L2x with the Y-polarized light pulsed beam L2y as a coaxial beam.

It is preferable that the optical element used in the polarized light combining unit 14 and the optical element used in the polarized light dividing unit 12 form a pair of the same type, but optical elements of different types may be used in combination. By using an optical elements having the same optical properties as used in the polarized light dividing unit 12 and for the polarized light combining unit 14, the linearly polarized light component separated into two parallel beams can be easily made original single pulsed beam again.

[Polarized Light Conversion Unit 15]

The polarized light conversion unit 15 converts the linearly polarized light emitted from the polarized light combining unit 14 into circularly polarized light, and is placed on the optical axis of the linearly polarized light pulsed beam L3. As an optical element constituting the polarized light conversion unit 15, for example, a quarter wavelength plate 26, a Babinet-Soleil compensator, or a liquid crystal polarizing element such as a liquid crystal variable retarder can be used. By converting the linearly polarized pulsed beam L3 having a modulation in which linearly polarized light in the x-axis direction and linearly polarized light in the y-axis direction are discretely repeated into circularly polarized light with the polarized light conversion unit 15, a circularly polarized pulsed beam L4 is obtained which does not contain any linearly polarized light component and has a modulation in which left circularly polarized light and right circularly polarized light repeat alternately.

[Other Optical Elements]

When an extended optical path is provided in the optical delay unit 13, the spread angle (divergence) of the beam diameter of the beam via the extended optical path may not be negligible compared to other beams. Therefore, it is preferable to place a beam expander or the like between the light source 10 and the polarized light dividing unit 12 to expand the beam diameter of the pulsed laser emitted from the light source 10 and suppress the spread of the beam in the extended optical path.

Alternatively, beam expanders can be placed before and after the extended optical path. In this case, the beam diameter is expanded before the extended optical path, the beam is passed through the extended optical path with a large beam diameter, and the beam expander is used in reverse direction to reduce the beam diameter back to the beam diameter as emitted from the light source 10 before being combined with the other component. Although this method makes the optical system somewhat complicated, it is possible to increase the light intensity per unit area of the circularly polarized light for the sample irradiation.

[Motion]

Next, the operation of the circularly polarized light illuminator of this embodiment will be described with the circularly polarized light illuminator shown in FIG. 3 as an example. The circularly polarized light illuminator shown in FIG. 3 includes a laser light source 20, a linear polarizer 21, an optical axis displacement element 22, an optical delay unit 13 having a rectangular prism mirror 23 and a retroreflector 24, an optical axis displacement element 25, and a quarter wavelength plate 26 arranged in this order.

In this circularly polarized light illuminator, first, a pulsed laser beam L1 emitted from the laser light source 20 is incident on the linear polarizer 21 in order to align the polarization. Then, the linear polarizer 21 generates linearly polarized light L2 in a direction of 45° from the x-axis or the y-axis. This linearly polarized light L2 is considered to be a combination of two linearly polarized states having the same intensity in the x-axis direction and the y-axis direction.

Next, the light is divided into an x-axis direction polarized component and a y-axis direction polarized component by the optical axis displacement element 22 to obtain two parallel beams, an X-polarized light pulsed beam L2x and a Y-polarized light pulsed beam L2y. For example, when a polarization beam displacer is used as the optical axis displacement element 22, then, as shown in FIG. 3, if the linearly polarized light L2 is made incident on the optical axis displacement element 22, the linearly polarized light component in the x-axis direction (X-polarized pulsed beam L2x) is displaced while maintaining its optical axis parallel to the incident optical axis, and is emitted.

On the other hand, the linearly polarized light component in the y-axis direction (Y-polarized light pulsed beam L2y) is emitted without any optical axis displacement, with the optical axis at the incidence unchanged. As a result, a pulse (X-polarized light pulse) Px composed of an x-axis direction polarized component and a pulse (Y-polarized light pulse) Py composed of a y-axis direction polarized component are simultaneously emitted from the optical axis displacement element 22.

Next, the optical delay unit 13 delays the emission timing of one of the X-polarized light pulsed beam L2x and the Y-polarized light pulsed beam L2y emitted from the optical axis displacement element 22 relative to the other component. For example, when delaying the X-polarized pulsed beam L2x, the Y-polarized pulsed beam L2y is emitted as it is, and only the X-polarized pulsed beam L2x is allowed to pass through the extended optical path formed by the rectangular prism mirror 23 and the retroreflector 24, as shown in FIG. 3.

In this case, the delay time of the X-polarized light pulsed beam L2x is preferably set to ½ of the repetition period of the pulse laser beam L1 emitted from the laser light source 20. Specifically, when the repetition period of the pulse laser beam L1 is 80 MHz, the delay time of the X-polarized light pulsed beam L2x is 6.25 ns, and the delay distance is 1.875 m. As a result, a parallel beam is obtained in which the X-polarized light pulse Px is emitted at an intermediate timing between the pulse intervals of the Y-polarized light pulse Py.

Next, both the X-polarized light pulsed beam L2x and the Y-polarized light pulsed beam L2y that have passed through the optical delay unit 13 are made incident on the optical axis displacement element 25, and these two parallel beams are returned to the same axis. At that time, the X-polarized light pulse Px and the Y-polarized light pulse Py alternately enter the optical axis displacement element 25. Then, for example, when a polarization beam displacer is used as the optical axis displacement element 25, the X-polarized pulsed beam L2x is shifted in a direction parallel to the incident optical axis, and is combined with the Y-polarized pulsed beam L2y, which travels along the incident optical axis without any displacement, as shown in FIG. 3.

As a result, the linearly polarized light pulsed beam L3 in which the X-polarized light pulse Px and the Y-polarized light pulse Py repeat alternately, that is, the x-axis direction polarization component and the y-axis direction polarization component are discretely repeated, is obtained. Note that, when a polarization beam displacer is used for the optical axis displacement elements 22 and 25, although it is conceivable that the x-axis direction polarized component and the y-axis direction polarized component pass through the element at different times, the difference is negligible and within a tunable range, so it is not a problem when combining these components.

Figure 4:
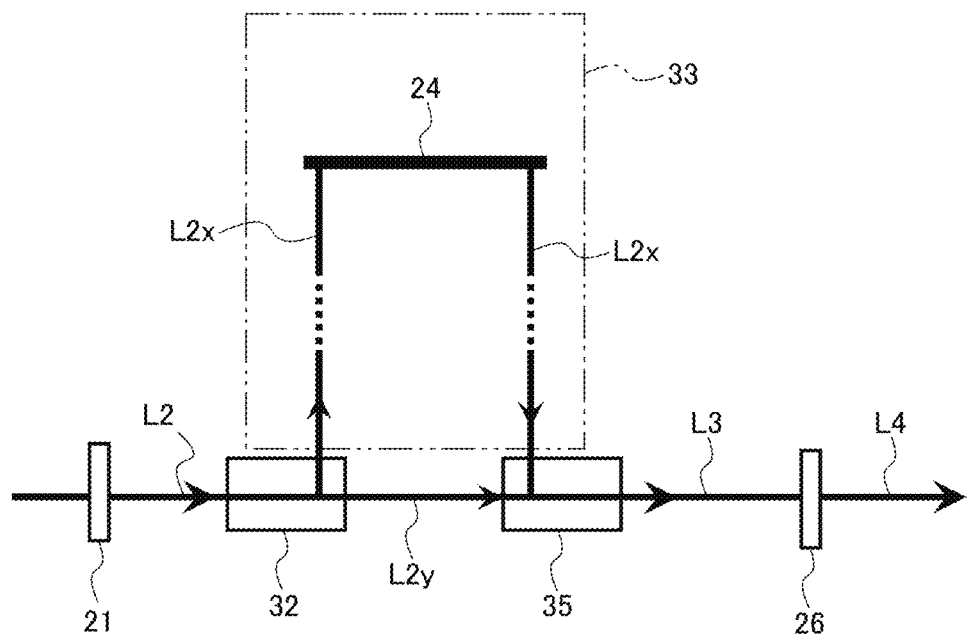
FIG. 4 is a schematic diagram showing an example of an optical path when an optical axis angle changing element is used instead of the optical axis displacement element 22.

In the circularly polarized light illuminator of this embodiment, an optical axis angle changing element can be used instead of the optical axis displacement elements 22 and 25 described above. FIG. 4 is a schematic diagram showing an example of an optical path when using optical axis angle changing elements. For example, when Glan-Taylor prisms are used as the optical axis angle changing elements 32 and 35, if the linearly polarized light L2 is incident on the optical axis angle changing element 32 as shown in FIG. 4, the linearly polarized light component in the x-axis direction (X-polarized pulsed beam L2x) changes the angle of the optical axis, changes the traveling direction, and is emitted.

On the other hand, the linearly polarized light component in the y-axis direction (Y-polarized light pulsed beam L2y) is emitted without changing the angle of the optical axis, along the optical axis at the incidence. As a result, a pulse Px composed of an x-axis direction polarized component (X-polarized light pulse) and a pulse Py composed of a y-axis direction polarized component (Y-polarized light pulse) are simultaneously emitted from the optical axis angle changing element 32. After that, by passing through an extended optical path provided in the optical delay unit 33, timing of the X-polarized light pulsed beam L2x emitted from the optical axis angle changing element 32 is delayed compared with the Y-polarized light pulsed beam L2y, for example.

The X-polarized light pulsed beam L2x that has passed through the optical delay unit 33 has its optical axis angle changed by the optical axis angle changing element 35, and is combined with the Y-polarized light pulsed beam L2y. As a result, the linearly polarized light pulsed beam L3 in which the X-polarized light pulse Px and the Y-polarized light pulse Py repeat alternately, that is, the x-axis direction polarization component and the y-axis direction polarization component are discretely repeated, is obtained.

Figure 5:
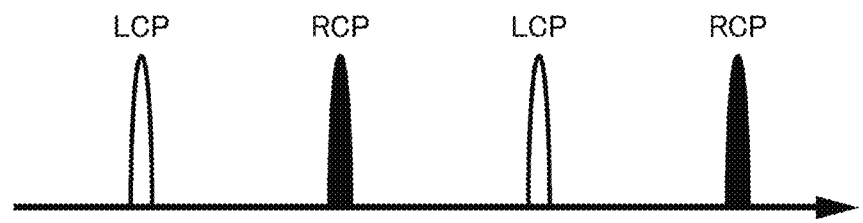
FIG. 5 is a diagram showing a polarization modulation pattern of emitted light from the circularly polarized light illuminator according to the first embodiment of the present invention.

FIG. 5 is a diagram showing a polarization modulation pattern of emitted light from the circularly polarized light illuminator of this embodiment. The linearly polarized light emitted from the optical axis displacement element 25 or the optical axis angle changing element 35 is converted into circularly polarized light by a quarter wavelength plate 26. Then, a circularly polarized pulsed beam L4, where commingling of linearly polarized light component is eliminated, having a polarization modulation pattern in which right circularly polarized pulses RCP and left circularly polarized pulses LCP repeat alternately as shown in FIG. 5 is continuously emitted from the quarter wavelength plate 26.

The circularly polarized light illuminator described in Patent Document 3 uses a mechanical chopper to block the light, so that only half or less of the light emitted from the light source can be used. On the other hand, in the circularly polarized light illuminator of this embodiment, one of the x-axis direction component and the y-axis direction component contained in the pulsed beam emitted from the light source is delayed relative to the other, so that the linearly polarized light is generated in which the linearly polarized light component in the x-axis and the linearly polarized light component in the y-axis direction repeat discretely, and this is converted into circularly polarized light, so 100% of the light can be utilized at a maximum if there is no need to take reflections and losses in the optical elements into account.

In addition, since the circularly polarized light illuminator of this embodiment uses a light source that emits pulsed light that repeats at a constant cycle, the modulation speed of right circularly polarized light and left circularly polarized light can be increased as compared to the method using a mechanical chopper. In particular, when a light source that generates pulsed light with a high repetition frequency is used, the effects of various disturbance noises from the environment can be avoided. Furthermore, since the circularly polarized light illuminator of this embodiment does not use a photoelastic modulator or the like, the resulting circularly polarized light does not commingles any linearly polarized light component, and there is no problem that the polarization state deviates from the circularly polarized light due to the nonlinearity of the modulator or phase distortion.

A similar high-speed discrete circular polarization modulation can also be achieved by using a non-polarizing beam splitter and multiple linear polarizers, but the configuration using these optical elements has a low light utilization efficiency, only about 25% at maximum. On the other hand, a light utilization efficiency of 100% can be achieved by using a polarizing beam splitter and a wavelength plate, but, at present, there is no polarizing beam splitter with a high extinction ratio, so it is not suitable for circular dichroism measurements that require high reliability.

As described above, by using the circularly polarized light illuminator of the present embodiment, it is possible to irradiate a sample with purely circularly polarized light without commingling of linearly polarized light components, but with higher efficiency and faster modulation compared with conventional ones. As a result, high-speed circular dichroism measurement, which is almost unaffected by artifacts, can be performed with high detection sensitivity.

Second Embodiment

Next, an analysis device according to a second embodiment of the present invention will be described. The analysis device of this embodiment includes the circularly polarized light illuminator 1 of the first embodiment described above or the circularly polarized light illuminator 2 of its modification, irradiates a sample with circularly polarized light L4 emitted from circularly polarized light illuminators 1 and 2, and measures the optical properties of the sample.

The analysis device of this embodiment may include one or more detectors that detect transmitted light, reflected light, scattered light, or luminescence such as fluorescence as electrical signals. In that case, each detector can be appropriately arranged according to the light to be detected. Further, although the type of detector is not particularly limited, photodetectors using solid-state imaging devices such as, for example, avalanche photodiodes, PMTs (Photo-Multiplier Tubes), CCDs (Charge Coupled Devices) and CMOSs (Complementary Metal Oxide Semiconductors) can be used.

Figure 6:
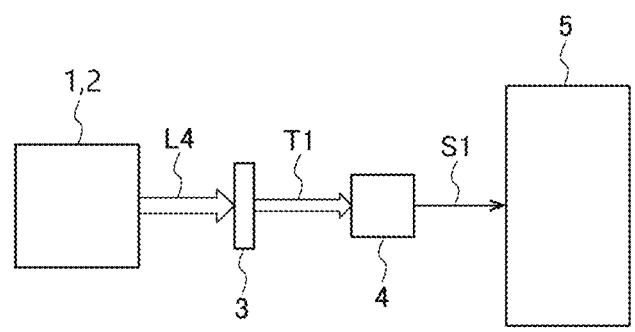
FIG. 6 is a schematic diagram showing a configuration example of an analysis device according to a second embodiment of the present invention.

FIG. 6 is a schematic diagram showing a configuration example of the analysis device of this embodiment. For example, when measuring circular dichroism with the analysis device of this embodiment, circularly polarized illuminators 1 or 2 and a photodetector 4 for detecting transmitted light T1 are arranged with a sample 3 inserted therebetween, as shown in FIG. 6. Further, the analysis device of the present embodiment may be provided with a circular dichroism detection unit 5 that generates a circular dichroism signal based on the optical signal Si detected by the detector 4.

In the circularly polarized light illuminators 1 and 2, the linearly polarized light emitted from the pulsed laser light source or the linearly polarized light extracted from the light emitted from the pulsed laser light source is divided into an x-axis direction component and a y-axis direction component, and after delaying one of its components relative to the other, they are combined again as one beam to generate a linearly polarized beam having a modulation in which the X polarized pulse and the Y polarized pulse repeat alternately. The circularly polarized light illuminators 1 and 2 then convert the x-axis direction component (X-polarized pulse) and y-axis direction component (Y-polarized pulse) of this linearly polarized beam into left circularly polarized light and right circularly polarized light, respectively, to generate a circularly polarized light pulsed beam L4 with alternating right and left circularly polarized light pulses, which is emitted continuously toward the sample 3.

Here, in the linearly polarized beam before conversion, since the light intensity $I_{XLP}$ of the x-axis direction component and the light intensity $I_{YLP}$ of the y-axis direction component are equal, also in the circularly polarized pulsed beam L4, the light intensity $I_{LCP}$ of the left circularly polarized component and the light intensity $I_{RCP}$ of the right circularly polarized component become equal. Further, if a Babinet-Soleil compensator is used as an optical element, it becomes possible to convert the x-axis direction component and the y-axis direction component of a linearly polarized beam into left circularly polarized light or right circularly polarized light with great accuracy.

Figure 7A:
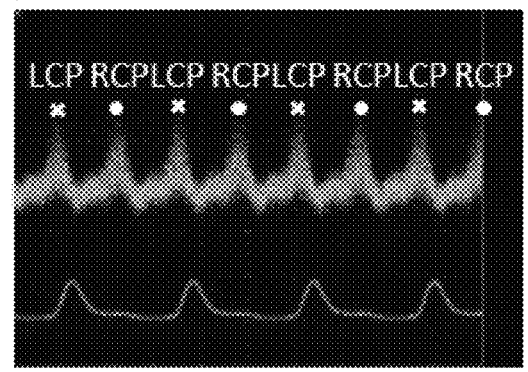
FIGS. 7A to 7C are diagrams showing detection signals, where
Figure 7B:
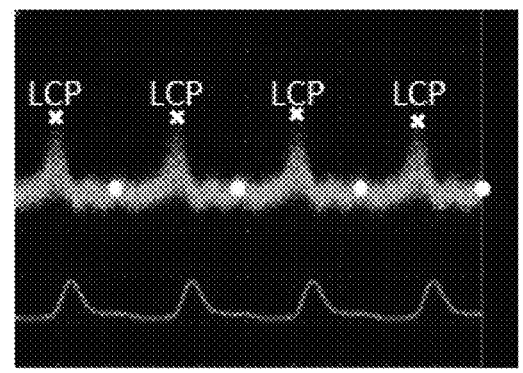
Figure 7C:
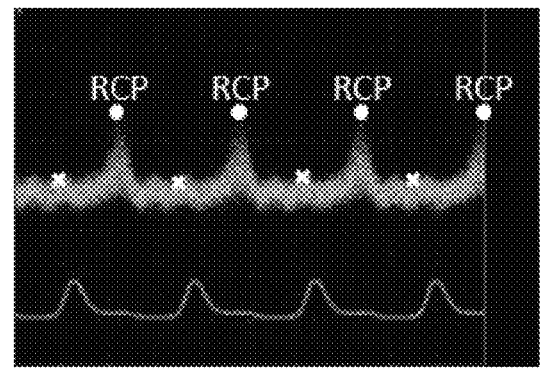

In the analysis device of this embodiment, the sample 3 is irradiated with the circularly polarized light L4 described above, and the light T1 transmitted through the sample 3 is detected by the detector 4. FIGS. 7A-C are diagrams showing the optical signal Si detected by the detector 4. When the sample 3 does not have circular dichroism, the detected signal intensity $I_{RCP}$ of the right circularly polarized pulse RCP and the detected signal intensity $I_{LCP}$ of the left circularly polarized pulse LCP detected by the detector 4 are equal, as shown in FIG. 7A. On the other hand, if there is a difference in absorbance (circular dichroism) between left circularly polarized light and right circularly polarized light at the wavelength of the incident light, there is a difference between the detected signal intensity $I_{RCP}$ of the right circularly polarized pulse RCP and the detected signal intensity $I_{LCP}$ of the left circularly polarized pulse LCP, as shown in FIGS. 7B and 7C.

Figure 8A:
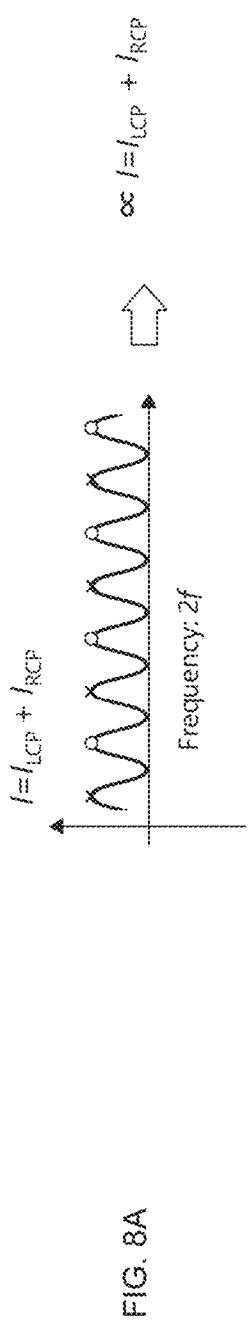
FIGS. 8A to 8C are diagrams showing circular dichroism signals obtained by lock-in detection.
Figure 8B:
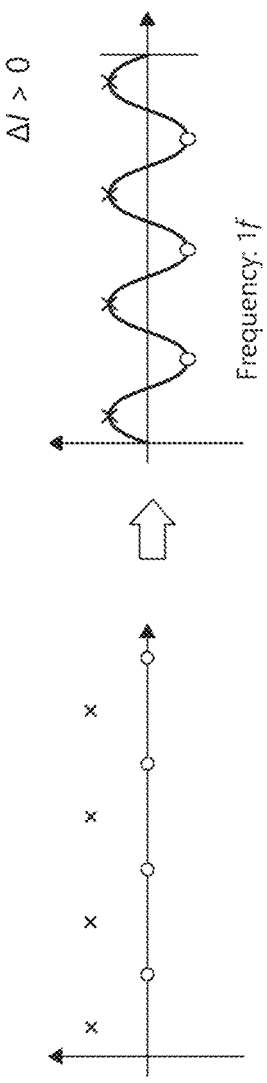
Figure 8C:
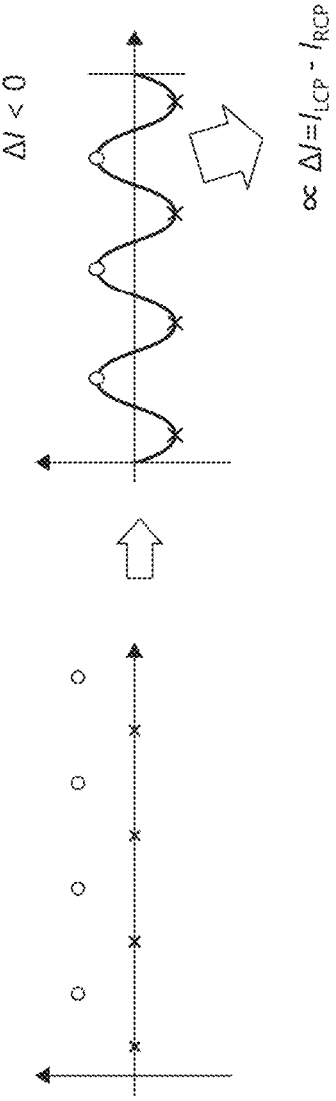

Then, the circular dichroism detection unit 5 generates a circular dichroism signal based on the optical signal Si detected by the detector 4. FIGS. 8A-C are diagrams showing circular dichroism signals obtained by lock-in detection, corresponding to FIGS. 7A-C, respectively. For example, the sum I ($=I_{LCP}+I_{RCP}$) of the light intensity when the sample 3 is irradiated with the right circularly polarized pulse RCP and the left circularly polarized pulse LCP is determined by lock-in detection at a frequency (2f) that is twice the repetition frequency f of the pulsed beam L1 emitted from the light source, as shown in FIG. 8A.

Further, the difference in light intensity $\Delta I$ ($=I_{LCP}-I_{RCP}$) when the sample 3 is irradiated with the right circularly polarized pulse RCP and the left circularly polarized pulse LCP is determined by lock-in detection at a repetition frequency f of the pulsed beam L1 emitted from the light source, as shown in FIGS. 8B and 8C. However, since the value obtained by the lock-in detection method described above is a relative value, it is necessary to calibrate the signal intensity by a method such as using a sample with a known absorbance (T. Narushima, H. Okamoto, "Circular Dichroism Microscopy Free from Commingling Linear Dichroism via Discretely Modulated Circular Polarization", SCIENTIFIC Reports, 6, Article number: 35731, 2016).

Figure 9:
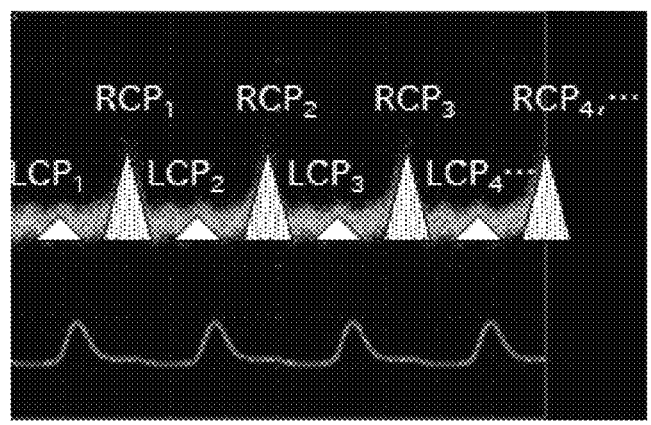
FIG. 9 is a diagram showing circular dichroism signals obtained by boxcar averaging.

FIG. 9 is a diagram showing circular dichroism signals obtained by boxcar averaging. By contrast, in the boxcar averaging shown in FIG. 9, the total light intensity I ($=I_{LCP}+I_{RCP}$) or the differential light intensity I ($=I_{LCP}-I_{RCP}$) is not integrated when the right circularly polarized pulse RCP and the left circularly polarized pulse LCP are irradiated, but the responses to the right circularly polarized pulse RCP and the left circularly polarized pulse LCP are independently integrated. Therefore, the signal intensities $I_{LCP}$ and $I_{RCP}$ when the right circularly polarized light pulse RCP and the left circularly polarized light pulse LCP are irradiated can be obtained independently.

As a result, by arithmetically operating the signal intensity $I_{RCP}$ of the right circularly polarized pulse RCP and the signal intensity $I_{LCP}$ of the left circularly polarized pulse LCP obtained by boxcar averaging, it is possible to calculate and evaluate the total light intensity I ($=I_{LCP}+I_{RCP}$) and the differential light intensity $\Delta I$ ($=I_{LCP}-I_{RCP}$) corresponding to the circular dichroism signal.

As described in detail above, since the analysis device of the present embodiment can irradiate the sample with circularly polarized light at high speed and with high efficiency without commingling of linearly polarized light components, the device not only evaluates and tracks the chirality of individual molecules, but also enables live observation of the process of chirality change due to the formation of aggregates and agglomerates, and can be a new means of observation and quantitative evaluation not only in the field of materials but also in a wide range of fields such as medicine and biology. Note that the analysis device of the present embodiment is capable of measuring reflected light, scattered light, or luminescence as well as measuring circular dichroism based on transmitted light as described above, and can also perform detection with higher accuracy than conventional devices.

Third Embodiment

Figure 10:
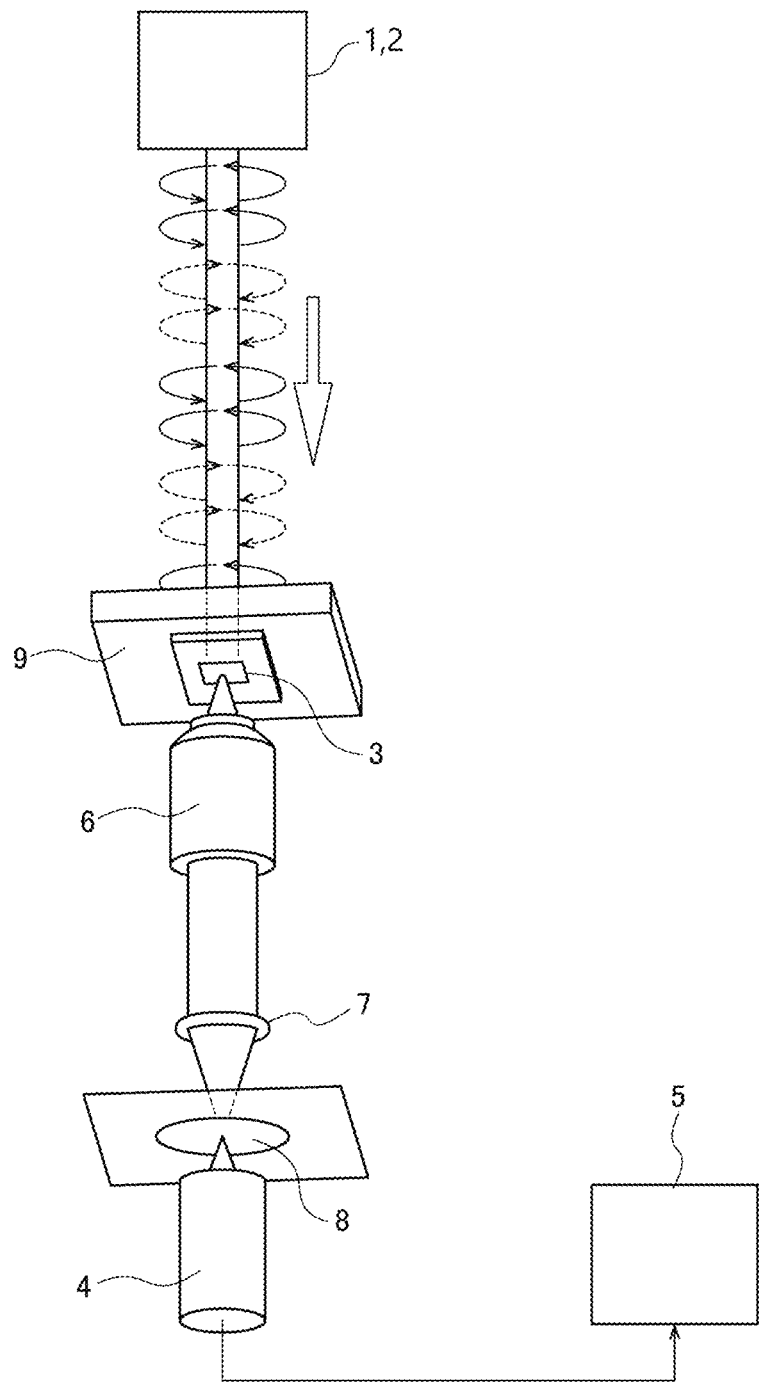
FIG. 10 is a schematic diagram showing a configuration example of a microscope according to a third embodiment of the present invention.

Next, a microscope according to a third embodiment of the invention will be described. The microscope of this embodiment includes the circularly polarized light illuminators of the first embodiment described above, and irradiates a sample to be observed with circularly polarized light emitted from the circularly polarized light illuminators 1 or 2. FIG. 10 is a schematic diagram showing a configuration example of a microscope according to this embodiment.

For example, when the microscope of the present embodiment is a circular dichroism microscope, the microscope includes circularly polarized light illuminators 1 or 2, an objective lens 6, an imaging lens 7, a photodetector 4, a circular dichroism detection unit 5, etc., as shown in FIG. 10. When observing the circular dichroism image of a sample 3 with the microscope shown in FIG. 10, the sample 3 is irradiated with circularly polarized light emitted from the circularly polarized light illuminator 1 or 2, the transmitted light from the sample 3 is collected with the objective lens 6, and then, an image is formed by the imaging lens 7, and detected as an electrical signal by the photodetector 4.

The electrical signal detected by the photodetector 4 is sent to the circular dichroism detection unit 5, where the circular dichroism signal is evaluated. Specifically, in the circular dichroism detection unit 5, lock-in detection is performed on the electrical signal detected by the photodetector 4 with the phase of the left and right circularly polarized light modulation in the circularly polarized light using a lock-in amplifier or the like, and a relative intensity difference $\Delta I$ ($=I_{LCP}-I_{RCP}$) and a total sum I ($=I_{LCP}+I_{RCP}$) of the left circularly polarized light and the right circularly polarized light in the transmitted light are obtained.

Alternatively, in the circular dichroism detection unit 5, the response to the right circularly polarized light pulse RCP and the response to the left circularly polarized light pulse LCP detected by the photodetector 4 are independently integrated by boxcar averaging to obtain the signal intensity $I_{LCP}$ and signal intensity $I_{RCP}$, and from these values, the total light intensity I ($=I_{LCP}+I_{RCP}$) and/or the differential light intensity $\Delta I$ ($=I_{LCP}-I_{RCP}$) are evaluated. This makes it possible to detect highly reliable circular dichroism signals with great sensitivity.

The microscope of this embodiment may be provided with a pinhole 8 at the surface of imaging plane of the transmitted light. In that case, light passing through the pinhole 8 is detected by the photodetector 4. By extracting a part of the optical image, which is formed by the objective lens 6 and the imaging lens 7, with the pinhole 8 as just described, the local response from the sample 3 can be detected. In addition, in the microscope of this embodiment, the core section of an optical fiber (not shown) may be placed at the surface of imaging plane of the transmitted light, and a portion of the formed optical image may be extracted by the core section of the optical fiber and delivered to the photodetector 4.

However, when the pinhole 8 or the core section of an optical fiber is used for the extraction, the signal obtained by the photodetector 4 is restricted to optical response from a specific region of the sample. Therefore, when observing a wider area, for example, by moving the sample 3 on the X-Y stage 9 or by moving the irradiation position from the circularly polarized light illuminators 1 or 2, the sample 3 is irradiated while relatively scanning the circularly polarized light. As a result, two-dimensional mapping of the local optical responses can be performed, and thus a scanning microscope image representing circular dichroism can be obtained.

Although acquisition of an image by scanning the sample described above is a method based on a single point measurement on the sample 3, combination with a multi-channel image sensor or extension to multi-channel detection via an optical fiber bundle or pinhole array disk are, in principle, possible, which depends on the required measurement conditions and detection sensitivity.

Furthermore, in the microscope of this embodiment, if a high-speed image sensor is used for the photodetector 4 and the lock-in detection or boxcar averaging described above is performed in each element, then, a microscopic image representing circular dichroism can be obtained without relatively scanning the sample 3 irradiated with circularly polarized light.

The microscope of this embodiment basically does not focus the circularly polarized light but irradiates the sample in the form of a parallel beam, and for example, when the polarization property of the light which is irradiated a sample 3 with is not disturbed, a condenser lens (not shown) or the like may be inserted between the circularly polarized light illuminator 1 and the sample 3 to collect the circularly polarized light emitted from the circularly polarized light illuminator 1 and irradiate the sample 3 with it.

As described above, the microscope of the present embodiment uses a circularly polarized modulated beam in which left and right circularly polarized light discretely repeat, which is generated by a circularly polarized light illuminator, as a parallel beam without focusing, and therefore, the sample can be irradiated while maintaining high purity of circular polarization, which suppresses unnecessary disturbance caused by the optical system. Compared to the circular dichroism microscope of Patent Document 3 using a mechanical chopper, the microscope of this embodiment can improve the modulation frequency of circularly polarized light by five orders of magnitude ($\times 10^5$) and the detection sensitivity of circular dichroism by one order of magnitude ($\times 10$).

In the microscope of this embodiment, by irradiating a sample with left circularly polarized light and right circularly polarized light as a single beam and detecting a local circular dichroism signal from the sample, local distributions of circular dichroism can be analyzed with high spatial resolution, even for non-homogeneous samples. Furthermore, since the microscope of this embodiment can obtain the spatial distribution of the circular dichroism intensity of the sample, for example, it is possible not only to evaluate and track the optical activity of individual molecules, but also to perform live observation of the process of changes in optical activity due to the formation of aggregates and agglomerates. That is, the microscope of this embodiment provides new observation and quantitative evaluation methods in a wide range of fields such as medicine and biotechnology.

Imaging techniques for observing the distribution state of circular dichroism have been only rarely used so far due to concerns about linear polarization artifacts induced by modulators, especially in solid-state samples. On the other hand, the microscope of the present embodiment can realize high-speed measurement of circular dichroism with great sensitivity and high spatial resolution, which is almost unaffected by these artifacts, and therefore, for example, it is useful for observing chirality conversion and transport processes of asymmetric molecules in living cells. In the future, if imaging technology using circular dichroism as a probe signal is established, by applying the microscope of this embodiment, a new bio-live imaging technology following molecular imaging methods using substrate staining and Raman scattering can be realized.

By using the microscope of this embodiment, the measurement time of the circular dichroism image, which used to take about 20 minutes to 1 hour with the conventional apparatus described in Patent Document 3, can be shortened to about 1 minute while maintaining sensitivity. Since the measurement time of the microscope of this embodiment is currently limited by the measurement program and the mechanical response speed of the scanning stage, it is possible to further shorten the measurement time by improving these. The configuration and effects of the microscope of this embodiment other than those described above are the same as those of the second embodiment described above.

EXAMPLES

Hereinafter, working examples and comparative examples of the present invention will be shown to specifically explain the effects of the present invention.

First Example

Figure 11:
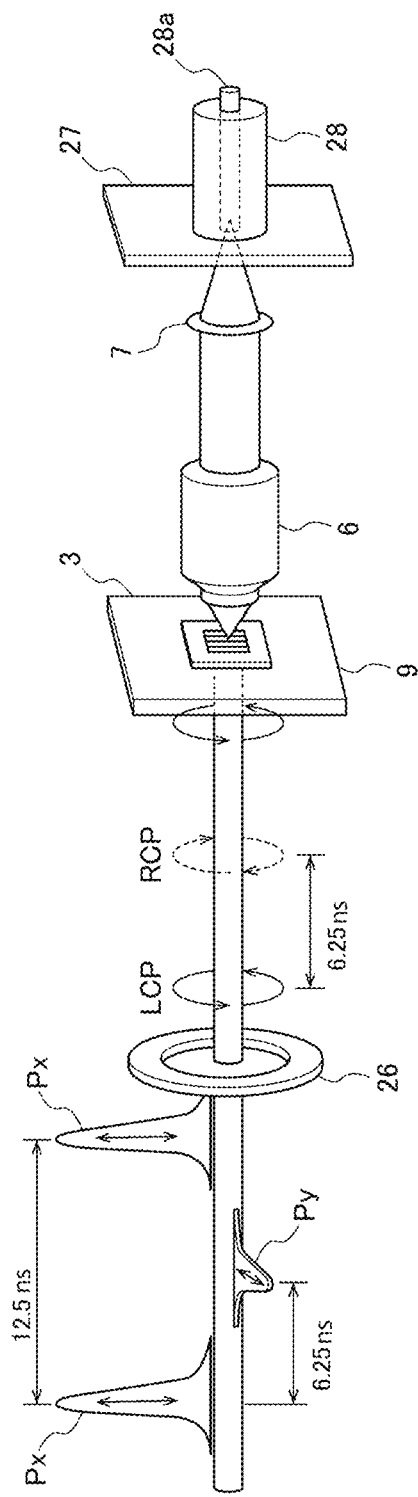
FIG. 11 is a schematic diagram showing the configuration of a microscope used in Example 1 of the present invention.

First, as a first example of the present invention, a circular dichroism image was observed using a circularly polarized light illuminator shown in FIG. 3. FIG. 11 is a schematic diagram showing the structure of the microscope used in this example. Further, FIG. 12A is a scanning electron microscope (SEM) image of the sample used in this example, FIG. 12B is a circular dichroism image of the sample in FIG. 12A observed with the microscope described in Patent Document 3, and FIGS. 12C-F are circular dichroism images of the sample shown in FIG. 12A observed with the microscope shown in FIG. 11 using the circularly polarized illuminator of FIG. 3.

In this example, in order to confirm whether the circular dichroism signal can be visualized while securing sufficient spatial resolution as an optical microscope, a two-dimensional metal nanostructure with a chiral shape that allows us to select the handedness of circular dichroism and to fabricate a sample in any area was used as the sample. Specifically, the sample was prepared by fabricating a plurality of pinwheel-shaped gold nanostructures at intervals of 1 µm on a glass substrate shown in the SEM image of FIG. 12A. In addition, for the optical image detection, the optical fiber 28 was arranged on the imaging plane 27 so that the core 28a was positioned at the imaging point of the transmitted light, a part of the formed optical image was extracted by the core 28a of the optical fiber 28 and transmitted to the photodetector 4, as shown in FIG. 11.

Figure 12A:
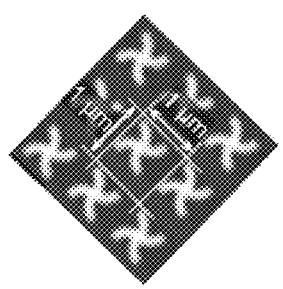
FIG. 12A is a scanning electron microscope (SEM) image of the sample used in the first embodiment of the present invention.
Figure 12B:
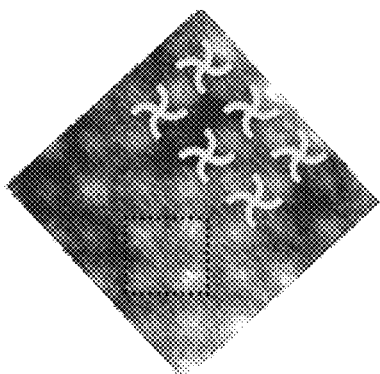
FIG. 12B is a circular dichroism image of the sample taken with the microscope described in Patent Document 3.
Figure 12C:
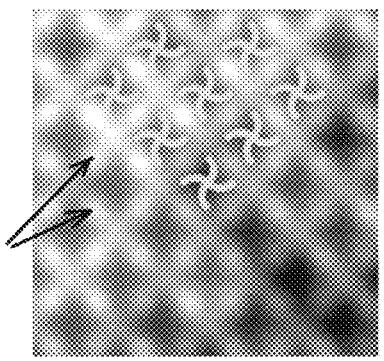
FIGS. 12C and 12D are intensity images of the light transmitted through the sample obtained by boxcar averaging.
Figure 12D:
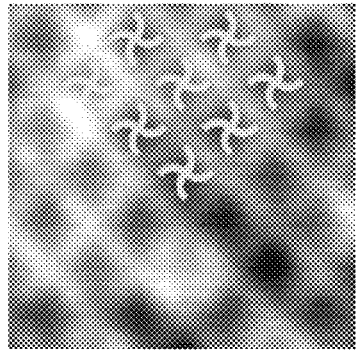

FIGS. 12C and 12D are light intensity images obtained by boxcar averaging by microscopic observation of the sample in FIG. 12A at a wavelength of 700 nm, FIG. 12C is an image based on the signal intensity $I_{LCP}$ of transmitted light when irradiated with a left circularly polarized light pulse LCP, and FIG. 12D is an image based on the signal intensity $I_{RCP}$ of the transmitted light when irradiated with a right circularly polarized light pulse RCP. In the figure, a schematic diagram of the corresponding pinwheel-shaped gold nanostructure array is shown. In the intensity images shown in FIGS. 12C and 12D, the center of each nanostructure was located at the site where strong extinction occurred. Further, in the intensity image when irradiated with a left circularly polarized light pulse LCP shown in FIG. 12C, a dot-like pattern indicating the maximum intensity of the transmitted light was observed at four locations around the nanostructure.

Figure 12E:
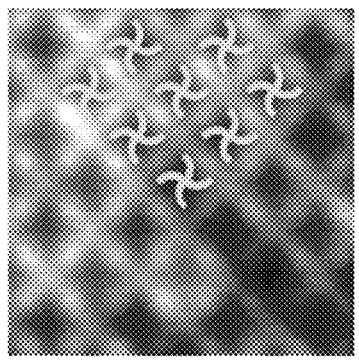
FIGS. 12E and 12F are an image for the sum I of the optical intensity calculated from the optical intensity signal and a circular dichroism image of the sample based on the difference ΔI.
Figure 12F:
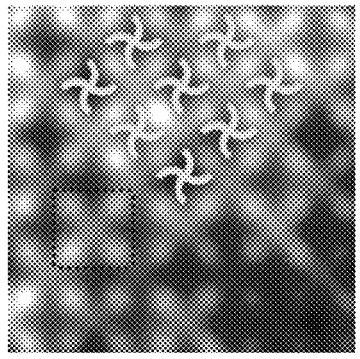

FIGS. 12E and 12F are light intensity images obtained by arithmetically processing the signal intensities $I_{LCP}$ and $I_{RCP}$ of the light transmitted through the sample, FIG. 12E is an image based on the total light intensity $I$ ($=I_{LCP}+I_{RCP}$), and FIG. 12F is an image based on the differential light intensity $\Delta I$ ($=I_{LCP}-I_{RCP}$), which corresponds to a circular dichroism image. The circular dichroism image shown in FIG. 12F was observed more clearly than the circular dichroism image observed by the previous apparatus shown in FIG. 12B.

The spatial resolution of an ordinary optical microscope that can distinguish between two points is estimated to be 570 nm when calculated from the measurement wavelength of 700 nm and the performance of the objective lens used (magnification: 40 times, numerical aperture NA: 0.75) according to Rayleigh's standard. On the other hand, in the circular dichroism image shown in FIG. 12F, a spot showing a maximum value of approximately 250 nm can be resolved, and therefore, it is considered that it apparently has a spatial resolution exceeding the diffraction limit, as a property of the circular dichroism microscope.

Second Example

Figure 13A:
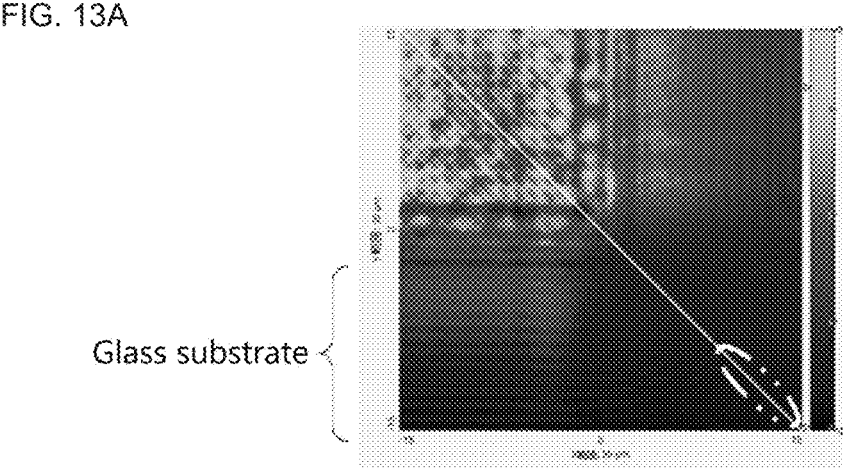
FIG. 13A is a circular dichroism image of the sample used in Second example of the present invention.
Figure 13B:
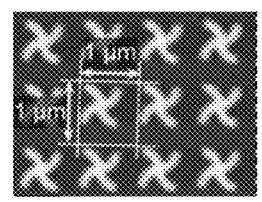
FIG. 13B is an enlarged image of the section where the gold nanostructure is fabricated.

Next, as a second example of the present invention, the circular dichroism image obtained by the circular dichroism microscope shown in FIG. 11 and the detection sensitivity of the circular dichroism signal used to form the image were evaluated. In this example, a sample was used in which a plurality of pinwheel-shaped gold nanostructures similar to the sample of the first example were fabricated on a part of a glass substrate. FIG. 13A is a circular dichroism image (the observation wavelength is 700 nm) of this sample, FIG. 13B is an enlarged image of the part where the gold nanostructure is fabricated, and FIG. 13C is a line profile of the relative intensity of the circular dichroism signal of the glass substrate area (the area surrounded by the two-dot chain line).

As shown in FIG. 13A, in the sample used in this example, nanostructures are fabricated in the upper left region of the image, and circular dichroism signals do not occur in the lower right glass substrate region of the image. Then, the difference $\Delta I$ ($=I_{LCP}-I_{RCP}$) in light intensity when the right circularly polarized light pulse RCP and the left circularly polarized light pulse LCP are alternately irradiated is, in principle, 0 (zero). Therefore, the line profile of the relative intensity of the circular dichroism signal $\{=(I_{LCP}-I_{RCP})/(I_{LCP}+I_{RCP})\times 100(\%)\}$ in the lower right glass substrate region of the image was measured, and the detection limit (noise level) was estimated from RMS (root mean square).

Figure 13C:
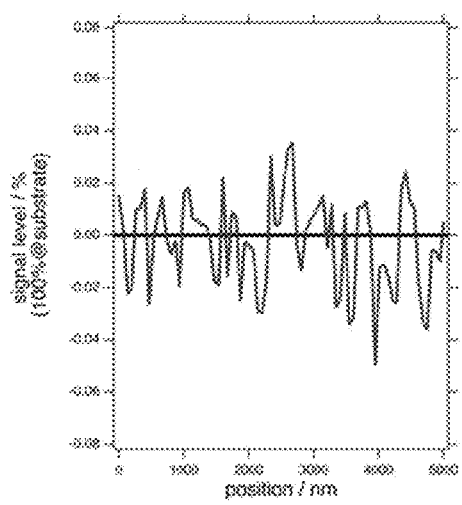
FIG. 13C is a line profile of the relative intensities of circular dichroism signals of the glass substrate part.

As a result, in measurements using an optical fiber with a core diameter of 50 µm, the line profile shown in FIG. 13C was obtained, and it was confirmed that detection sensitivity of about 0.014% RMS value (ellipticity 1.98 mdeg.) was achieved with an image acquisition time of about 20 minutes. On the other hand, when the same measurement was performed using a pinhole with a diameter of 100 µm with a previous circular dichroism microscope using a mechanical chopper, the RMS value was about 0.14% (ellipticity 20.1 mdeg.) with an image acquisition time of about 2 to 4 hours.

From these results, it was confirmed that the sensitivity of the circular dichroism microscope of the present invention is approximately one order of magnitude higher than that of the previous circular dichroism microscope, although the measurement time is short. In fact, comparing with the circular dichroism image of FIG. 12B observed with a microscope using a mechanical chopper, it can be visually confirmed that the sensitivity is improved in the circular dichroism image of FIG. 12F observed with the microscope of the present invention shown in FIG. 11. Here, the area surrounded by the dashed line in FIG. 12B and the area surrounded by the dashed line in FIG. 12F are equivalent areas on the sample.

Figure 14A:
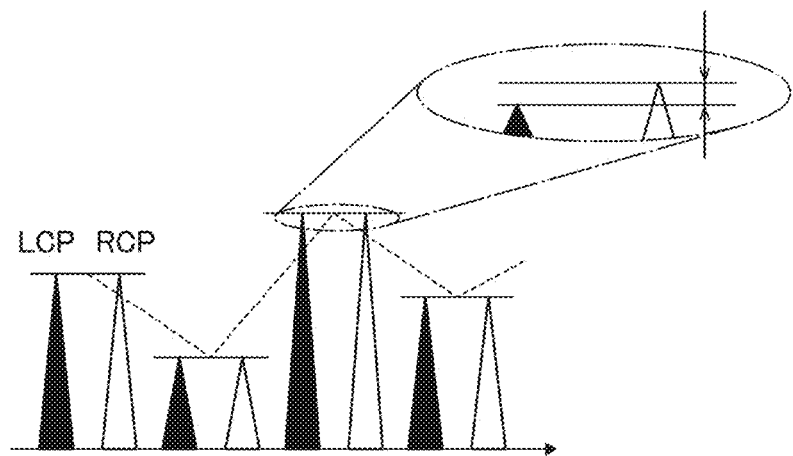
FIGS. 14A and 14B are graphs showing the relationship between laser output fluctuations and circular dichroism signals.
Figure 14B:
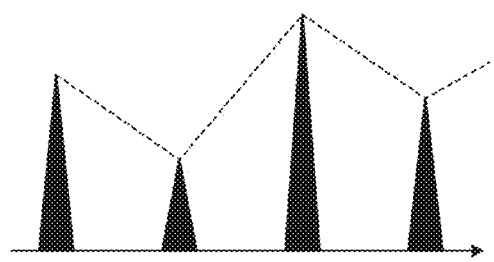
Figure 15:
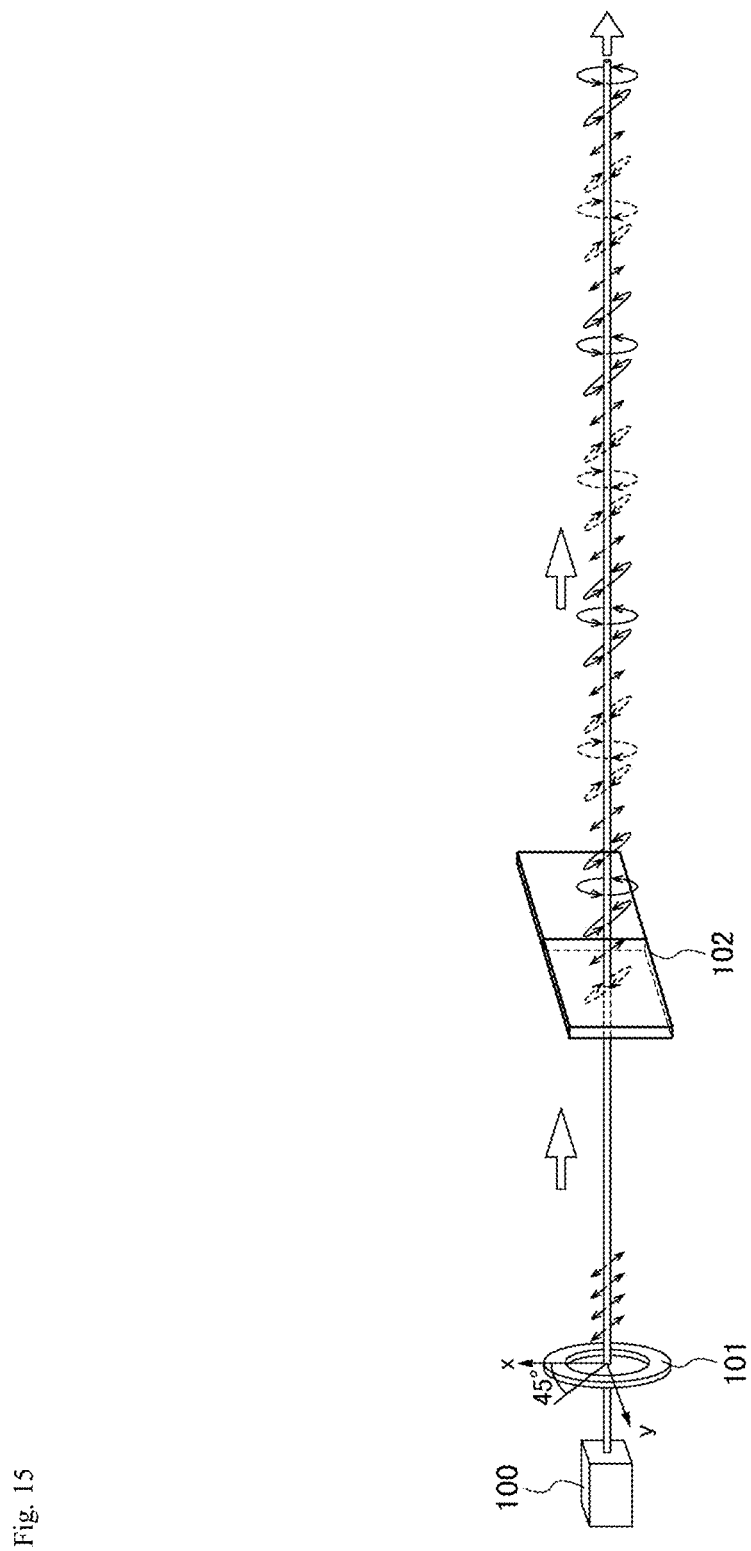
FIG. 15 is a schematic diagram showing a configuration example of a conventional circularly polarized light illuminator.

The circular dichroism microscope of the present invention can be expected to further improve the detection sensitivity if the power of the laser used as the light source of the circularly polarized light illuminator is increased. However, in general, when there is fluctuation in the light intensity of the pulsed laser, the fluctuation may limit the detection sensitivity. FIGS. 14A and 14B are diagrams showing the relationship between laser output fluctuations and circular dichroism signals, FIG. 14A is a diagram showing intensity changes of circularly polarized modulated light, and FIG. 14B is a diagram showing intensity fluctuations of a pulsed laser light source.

The output of the laser (white light laser EXR-15 manufactured by NKT) used in this example also fluctuates by about 0.5%. Therefore, in the intensity images of FIGS. 12C to 12E, streaky noise occurs in the horizontal direction reflecting the output fluctuation. In contrast, the circular dichroism image in FIG. 12F does not have streaky noise even though no special filter processing such as smoothing has been performed.

This can be illustrated by FIGS. 14A and 14B. For example, when there is fluctuation as shown in FIG. 14B between each pulse emitted from the pulsed laser light source, evaluation is made by the difference $\Delta I$ ($=I_{LCP}-I_{RCP}$) in light intensity when the right circularly polarized light pulse RCP and the left circularly polarized light pulse LCP are alternately irradiated in the circular dichroism measurement, while when the optical arrangement shown in FIG. 3 is adopted, as shown in FIG. 14A, the right circularly polarized light pulse RCP and the left circularly polarized light pulse LCP are a copy (replica) of the same pulse, and thus, intensity fluctuations in laser output do not affect circular dichroism measurements. That is, by using the circularly polarized light illuminator of the present invention, a circular dichroism image (differential intensity image) in which noise caused by laser fluctuation is cancelled, can be obtained.

Not that the value of the detection limit estimated in this example was a value under microscopic measurement conditions, and was obtained by using an optical fiber with a core diameter of 50 μm and a 40× objective lens to evaluate a very small spatial region with a diameter of about 1.25 μm on the sample. Therefore, for example, if the core diameter is increased to expand the detection area, the spatial resolution will decrease, but the detection limit can be improved.

From the above results, it was confirmed that by using the circularly polarized light illuminator of the present invention, it is possible to improve the modulation frequency compared to the conventional one, and to realize high-speed and high-sensitivity circular dichroism measurement.

The invention claimed is:

1. A circularly polarized light illuminator, comprising:
   a light source that emits pulsed light;
   a polarized light dividing unit that divides the pulsed light emitted from the light source into an x-axis direction polarized light component and a y-axis direction polarized light component;
   a optical delay unit that delays one of a pulse of the x-axis direction polarized light component and a pulse of the y-axis direction polarized light component separated in the polarized light dividing unit in relation to the other;
   a polarized light combining unit that combines a pulsed beam composed of the x-axis direction polarized light component and a pulsed beam composed of the y-axis direction polarized light component emitted from the optical delay unit coaxially to generate a linearly polarized light pulsed beam having a modulation in which the x-axis direction polarized light component pulse and the y-axis direction polarized light component pulse repeat alternately; and
   a polarized light conversion unit that converts the linearly polarized light emitted from the polarized light combining unit into circularly polarized light.

2. The circularly polarized light illuminator according to claim 1, wherein a circularly polarized light pulsed beam having a modulation in which a right circularly polarized light pulse and a left circularly polarized light pulse repeat alternately is emitted from the polarized light conversion unit.

3. The circularly polarized light illuminator according to claim 1, wherein the optical delay unit makes the optical path length of either one of the x-axis direction component and the y-axis direction component of the incident linearly polarized light longer than the optical path length of the other.

4. The circularly polarized light illuminator according to claim 3, wherein the optical delay unit is provided with an extended optical path composed of a rectangular prism mirror and a retroreflector.

5. The circularly polarized light illuminator according to claim 1, wherein a delay time is set such that a pulse of the delayed component is emitted between one pulse of the non-delayed component and the next pulse, in the optical delay unit.

6. The circularly polarized light illuminator according to claim 1, wherein the polarized light dividing unit comprises an optical element that displaces, or changes the angles of, the optical axis of either one of the x-axis direction polarized light component or the y-axis direction polarized light component with respect to the optical axis at the incidence.

7. An analysis device
   comprising the circularly polarized light illuminator according to claim 1, and
   irradiating a sample with circularly polarized light emitted from the circularly polarized light illuminator and measuring the optical properties of the sample.

8. The analysis device according to claim 7, comprising one or more photodetectors for detecting transmitted light, reflected light, scattered light, or luminescence from the sample as electrical signals.

9. The analysis device according to claim 8, comprising a circular dichroism detection unit that obtains a circular dichroism signal from the electrical signal detected by the photodetector.

10. The analysis device according to claim 9, wherein in the circular dichroism detection unit, the electrical signal of the transmitted light detected by the photodetector is lock-in-detected at a repetition frequency f of the pulsed beam emitted from the light source, and a relative intensity difference between the left circularly polarized light and the right circularly polarized light in the transmitted light is determined, to obtain a circular dichroism signal.

11. The analysis device according to claim 9, wherein in the circular dichroism detection unit, the response to the right circularly polarized light pulse and the left circularly polarized light pulse of the transmitted light detected by the photodetector are separately integrated, and the signal intensity when irradiated with the right circularly polarized pulse and the signal intensity when irradiated with the left circularly polarized pulse are determined independently, and the circular dichroism signal is evaluated from the intensity difference between them.

12. A microscope
comprising the circularly polarized light illuminator according to claim 1, and
irradiating a sample to be observed with circularly polarized light emitted from the circularly polarized light illuminator.

13. The microscope according to claim 12, comprising:
an objective lens for collecting transmitted light from the sample;
an imaging lens that forms an image of the transmitted light emitted from the objective lens;
a photodetector that detects the transmitted light as an electrical signal; and
a circular dichroism detection unit that obtains a circular dichroism signal from the electrical signal detected by the photodetector.

14. The microscope according to claim 13, wherein in the circular dichroism detection unit, the electrical signal of the transmitted light detected by the photodetector is lock-in-detected at a repetition frequency f of the pulsed beam emitted from the light source, and a relative intensity difference between the left circularly polarized light and the right circularly polarized light in the transmitted light is determined, to obtain a circular dichroism signal.

15. The microscope according to claim 13, wherein in the circular dichroism detection unit, the response to the right circularly polarized light pulse and the left circularly polarized light pulse of the transmitted light detected by the photodetector are separately integrated, and the signal intensity when irradiated with the right circularly polarized pulse and the signal intensity when irradiated with the left circularly polarized pulse are determined independently, and the circular dichroism signal is evaluated from the intensity difference between them.

16. The microscope according to claim 13, wherein a core section of an optical fiber is arranged at an image forming position of the transmitted light, and a part of the image of the transmitted light is extracted by the optical fiber and transmitted to the photodetector.

* * * * *